United States Patent
Freeman et al.

(10) Patent No.: US 8,437,954 B1
(45) Date of Patent: May 7, 2013

(54) REAL TIME TRAVEL DIRECTOR

(75) Inventors: Mitchael C. Freeman, Tulsa, OK (US); Michael H. Freeman, Tulsa, OK (US)

(73) Assignee: Intelligent Design Labs, L.L.C., Tulsa, OK (US)

( * ) Notice: Subject to any disclaimer, the term of this patent is extended or adjusted under 35 U.S.C. 154(b) by 1262 days.

(21) Appl. No.: 11/807,969

(22) Filed: May 31, 2007

Related U.S. Application Data

(60) Provisional application No. 60/803,806, filed on Jun. 2, 2006.

(51) Int. Cl.
*G01C 21/00* (2006.01)
(52) U.S. Cl.
USPC .......................................................... 701/426
(58) Field of Classification Search .................... 701/211
See application file for complete search history.

(56) References Cited

U.S. PATENT DOCUMENTS

| | | | |
|---|---|---|---|
| 7,259,656 B1 * | 8/2007 | Wright | 340/286.14 |
| 7,263,375 B2 * | 8/2007 | Zavada et al. | 455/456.6 |
| 7,865,306 B2 * | 1/2011 | Mays | 701/437 |
| 2006/0135183 A1 * | 6/2006 | Zavada et al. | 455/457 |
| 2006/0290519 A1 * | 12/2006 | Boate et al. | 340/573.4 |
| 2007/0067104 A1 * | 3/2007 | Mays | 701/211 |
| 2007/0198174 A1 * | 8/2007 | Williams et al. | 701/202 |
| 2007/0198175 A1 * | 8/2007 | Williams et al. | 701/202 |

* cited by examiner

*Primary Examiner* — Shelley Chen
(74) *Attorney, Agent, or Firm* — Howard & Howard Attorneys PLLC

(57) ABSTRACT

A travel director provides persons, robots and/or vehicles with real time "you-are-here" directions to a destination or series of destinations within a defined environment, such as a building. large aircraft, train or submarine. The director can also locate and/or direct travel to specific coordinates, people, places, and/or components and equipment within a defined environment. The director creates a complete virtual signature of an existing physical building/structure and defines coordinates on a virtual grid and compares the linear range from a set of unique segments programmed on multiple sequenced and strategically placed identifier tags/chips or from identified telemetric signals pre-existing in the environment.

35 Claims, 4 Drawing Sheets

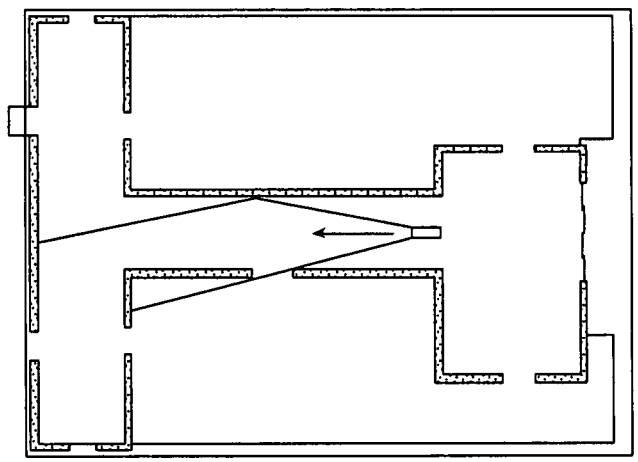
*Fig. 8*
 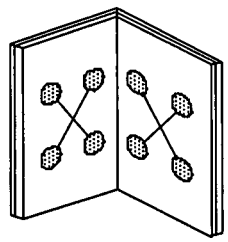 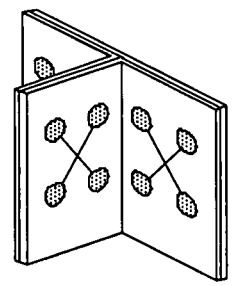
*Fig. 9*      *Fig. 10*      *Fig. 11*
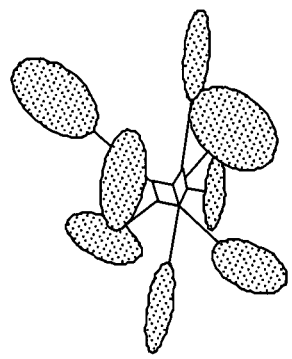 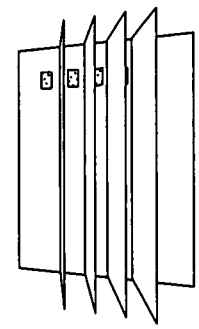
*Fig. 12*      *Fig. 13*

REAL TIME TRAVEL DIRECTOR

REFERENCE TO PENDING APPLICATIONS

This application is based upon and claims priority to U.S. Provisional Patent Application No. 60/803,806 which was filed on Jun. 2, 2006.

BACKGROUND OF THE INVENTION

This invention relates generally to locator systems and more particularly concerns real time locators using signals which are not interrupted by line of sight obstacles.

There is a need in the art for a mobile building positioning system that can provide a user with exact directions to a specific location or locations input as one or more destinations; or provide a user's position within a building, or locate a specific items, place(s) or thing within a building and or facility. Current options exclude the economical or practical use of any system relying on the commonly used technology available from GPS because of the limitations of "line of sight" which is obstructed by the physical properties of a building. Other systems available now all have similar limitations. For instance, a "way-finding" system like is in use in many hospitals, consists of computer monitors/kiosks located at primary locations within the building which can be accessed by a user to print out a map from his location to a specific location programmed into the system. This system has inherent limitations in that the user must interpret the paper map with no 'on-going' dialog or input along the pathway as to correct or incorrect selections of turns or travel. Also, the user of this system must, on his/her own logic, determine the progression of any route and final destination without any further feedback or interaction from the way-finding system. This results in misinterpretations and errors by users causing a failure in the user's travel within a building to the desired location. Also, because there is no process for any feedback en-route, the user, many times, does not even know he has made a mistake until he fails to find the desired end location. This can be time consuming and provide frustration to a user who is likely unfamiliar with the actual routes available surrounding their current building and/or facility location. Systems like the "Way-Finder" systems relies heavily on the ability of the user to interpret the map correctly and identify on his own specific building visual cues. Global Position Systems are not usable within a building or facility due to the lack of 'line-of-sight" to multiple satellite locations indoors. Radio-frequency triangulation ("RFT") systems also have limitations that are overcome by the invention. RFT's require major installation of wiring throughout a building, causing disruption and damage to walls, ceilings, floors, and other wired devices; and require fixed radio frequency transceivers which must be attached to walls and/or ceilings. These fixed monitors must operate based on a control system that take up value building and telecommunication space. RFT's also rely on the continuous 'beaming' of radio frequency throughout the building for use, whether needed at that moment or not. Also, coverage with RFT's rely on overlapping coverage areas, RTS's can leave gaps in coverage, and usually require that people be showered with RF on a constant basis. Current applications of RFID only contemplate the use of 'portal' technology, where the only information provided by a tag is whether or not a user or item has gone through a portal.

An inertial guidance system is practically cost prohibitive and must be calibrated frequently and even when correctly calibrated suffers from 'drift' complications, prohibiting precise locations and lacks feedback from actual building identifier locations.

With the establishment and advancements of such technology as RFID technology, unique locations within a building can be assigned an exact identifier that can be associated in a logical computer data base creating a grid pattern for the entire building that correlates to the actual physical properties of any building.

SUMMARY OF THE INVENTION

In accordance with the invention, there is provided a real time travel director including means and method (FPS) for the interactive mapping of a building or warehouse or other usable structure such that a user can access building co-ordinates via a mobile unit which can provide real time information about where the user (whether a human, robotic or vehicle ["HRV"]) is in a building and where a user needs to go for a pre-determined location and carrying along other information to present at the destination or any interim point.

A Remote Mobile Unit ("RMU") tracks the HRV user's progress towards the destination and provides a real time output in GUI interface, other visual and audio to provide clues to the user for further progress along the route. For instance, the RMU compares a segment of the linearly placed ID tags with themselves and/or other resident telemetric signatures to any device that is capable of receiving any telemetric frequencies (any frequency from the audio to infra-red spectrums) and identify the same. The second component is a unique identifies, such as an RFID "tag" chip or other unique telemetric frequency identifier that is either assigned or possesses a unique identifier within a building and/or facility. A third component is a computerized logic program contained in the receiver or base unit that provides a grid pattern of the identifiers that corresponds with specific locations within a building and/or facility. A fourth component is a data base unit that provides the unique tag with a position within a known or existing building structure. The building coordinates are established by associating logical coordinates with the identifiers. Each 'sweep' of the reader collects data and compares it to the data base within the mobile reader and/or data base unit and provides the user with his location. Or, the destination can be pre-established by user input to the Reader/base unit to provide an interactive map and direction finder to the user when activated on reads from the identifiers. The mobility aspect of the invention is such that as the receiver receives and evaluates the input data from the unique identifiers, it corresponds those unique positions within the fixed locations of the building according to its data base, and establishes the user's position either in transit, as a fixed position, or expressed as a route map as shown by a GUI interface on the receiver. The Receiver can also be programmed to create a route map to a specific devise, place or thing, that has been assigned a unique place in the building and has been assigned a unique identifier. The Receiver can have data from the base unit down loaded into it or can download information into the base unit. The logic can also be programmed by the receiver relative to the unique identifiers. Places and equipment can be established on the grid system, providing a user with a unique location for a specific item, place or piece of equipment, and establish a travel route to that item, place or thing. The System can also prioritize methods and manners of travel to efficiently and effectively provide a HVR User with a preferred trip order, preferred trip ending, preferred interim stops, or preferred prioritized stops first then other less priority stops later, to name a few. The HVR user can also prioritize for on end destination, several interim destinations, or prioritize the interim stops along the way and even plan according to a timing mechanism which will put the HVR User at certain stops at specific times. The System can also be programmed to provide a read-out to avoid certain places and verify when each final and/or interim destination has been reached both to an end user and to a master data base.

The System can use either passive or active RFID tags and use either low frequency, high frequency ("near field") and/or ultra high frequencies ("far field").

In an upgrade, the FMPS can be programmed to include electronic documentation that is instantly downloaded when a specific destination is reached, or be programmed with electronic 'credits' that instantly credit an account when an interim and/or final destination is reached. For instance, in a hospital application, where a patient is traversing the hospital to take various medical tests, the FMPS can be programmed with the insurance data of a person using the FMPS which is downloadable automatically when the person arrives at a specific location at a hospital; or the information that would be downloaded could include the patient name and number of a patient and other patient account and medical records reference, such that when the patient holding a RMU reaches the desired location for a test, it is programmed to prompt a existing receptor program at that testing site where the RMU sends an indicator alerting a patient staging program on the receptor program, thus, sending the patient's name and number and accounting formation and other information, prompting the hospital personnel to know that the patient has appeared for whatever test is necessary at that location and having the RMU prompt the information in their resident data bank for use and application.

BRIEF DESCRIPTION OF THE DRAWINGS

Other objects and advantages of the invention will become apparent upon reading the following detailed description and upon reference to the drawings in which:

FIG. 8 is a perspective view illustrating the use of the real time travel director by a robotic unit in a passageway of the environment;

FIG. 9 is a graphic representation of an RFID tag;

FIG. 10 is an illustration of a use of multiple tags of FIG. 9 on a first substrate;

FIG. 11 is an illustration of a use of multiple tags of FIG. 9 on a second substrate;

FIG. 12 is an illustration of a use of multiple tags of FIG. 9 oriented at multiple angles; and FIG. 13 is an illustration of a use of multiple tags of FIG. 9 on a third substrate.

While the invention will be described in connection with preferred embodiments thereof, it will be understood that it is not intended to limit the invention to those embodiments or to the details of the construction or arrangement of parts illustrated in the accompanying drawings.

DETAILED DESCRIPTION OF THE INVENTION

A description of the Mobile Facility Destination/Location System with a prioritization and optimization selection feature follows.

Figure 1:
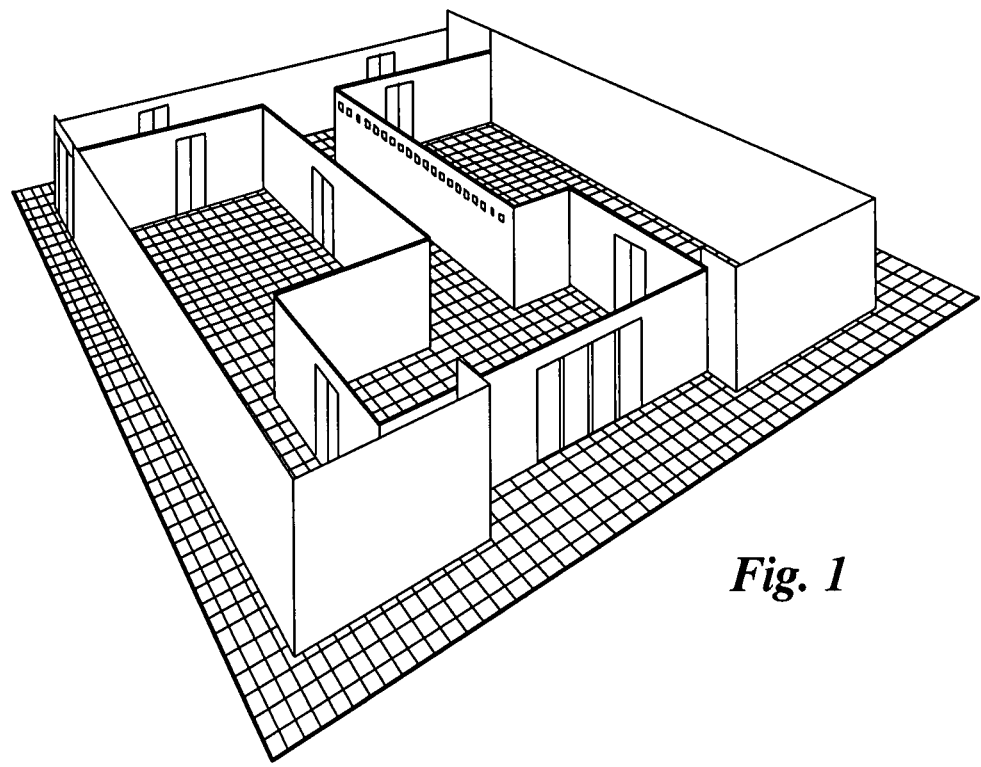
FIG. 1 is a perspective view of an environment, such as a hospital floor, in which the real time travel director may be used.

The Mobile Facility Destination/Location System ("FDLS") is a new product/system/invention for 'real-time' directing of human/robotic/vehicular ("HRV") travel via a handheld remote mobile unit ("RMU") device that displays 'real time' directions for finding a destination or series of destinations within a defined space like a building or facility or other physical property. For the purposes of this description, it is contemplated that a building such as a hospital is used as an example. (See, FIG. 1, a depiction of a floor within a building).

However, under the teachings of this invention the invention could also be used in other physical properties like a large aircraft, train or submarine, which cannot otherwise obtain static signals such as GPS positioning.

Figure 2:
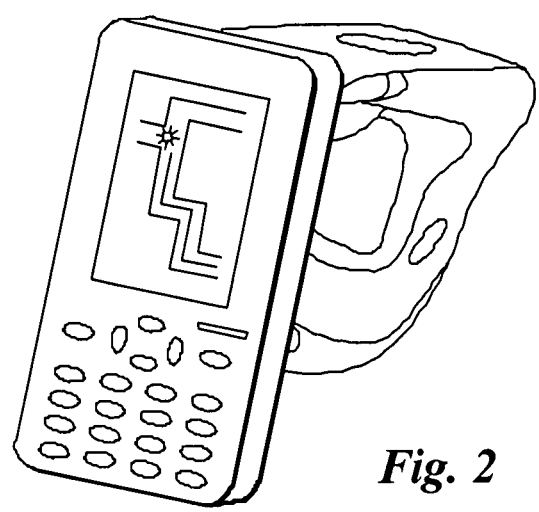
FIG. 2 is a perspective view of the real time travel director illustrating its operation in a passageway of the environment.

The FDLS can also locate and direct travel to specific coordinates, people, places, and/or components and equipment within a facility. (See, FIG. 2).

Figure 3:
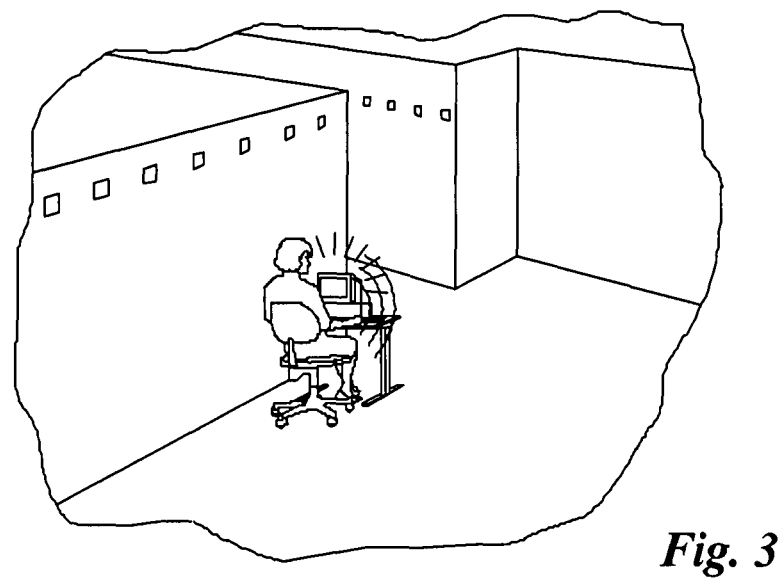
FIG. 3 is a perspective view of the real time travel director utilizing processor bandwidth of another computer via wireless connection.

By the teaching of the invention method disclosed herein, the FDLS creates a complete virtual signature of an existing physical building/structure and defines coordinates on a virtual grid within the RMU by comparing the linear range from a set of unique segments programmed on multiple sequenced identifier tags ("ID's" or "ID tags") programmed on strategically placed ID's, such as active and/or passive RFID (Radio Frequency Identification) tags/chips, or by identifying existing telemetric signals pre-existing in a building/facility. (See, FIG. 3).

The system operates by comparing the linear interrogations with other unique signatures from other RFID tags or from other existing radio frequency (RF) signals or any other telemetric signatures available within the facility. In one embodiment, to create the virtual space, the FDLS RMU first programs the ID tags according to a spacial and/or descriptive attributes or other categorical attributes or identifiers thereof in order to make available spontaneous relational sequencing and ordering from the ID tags. In this embodiment, the mobile FDLS device, in user 'origination' mode, upon receiving a 'start' instruction reads available signatures from ID tags and develops them into a virtual space capable of configuring a logical progression of path segments, based on relative spacing of objects and virtual objects, for a visual/audio read out on the FDLS RMU. This is done for such a purposes as providing to the HRV user various logical path segments leading to a final desired and input destination which defines one or more specific methods of actual physical travel within a building/facility avoiding obstacles to travel. The FDLS System determines from the virtual grid locations correlation to actual places in a facility to achieve one or more actual possible physical methods of travel, along path segments, within the defined space of a building or a facility or other physical property.

In one use, an HRV makes an inquiry about a destination, and then the logical computer system within the FDLS RMU inventories options from its virtual ID tags data base and creates a route, expressed in one or more directional path segments that ultimately link a complete path together which leads the HRV User from one specific point in a facility to a final destination. (See, FIG. 2). In another use, the HRV User makes an 'optimized travel request' ("OTR") based prioritization of categorical attributes. Optimized travel requests are expressed as categories of equipment, like HVAC units, electrical boxes, plumbing and the like. Another way to create OTR's is to create categories of priority items such as travel by a doctor having an emergency room as a priority or OTR.

Figure 4:
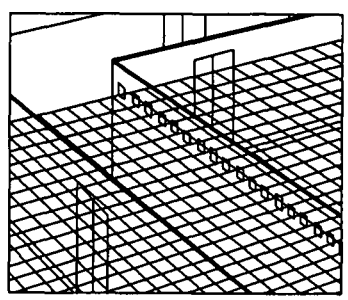
FIG. 4 is a perspective view illustrating the environment with a virtual grid superimposed.

The FDLS System can be programmed to provide grid resolution to very exacting locations (within a few inches) or general locations (within a few feet) as desired. Grid resolution is a factor of the number of actual/virtual ID tags and their corresponding inputs into the FDLS System, which affects costs and can be scaled up and down for higher or lower resolution. (See FIG. 4).

The initial query about a destination, route or circuit of travel can be input into the RMU through the process of virtual identification described below, or the RMU can use available technology such as "bar codes" to read from a pre-programmed list, whereby the human user does not need to know where any particular item is, but can scan these selections as input to the RMU via a electronic or hard-copy "index" or "list". For instance, if an HVAC employee needed to inspect all or a specific air conditioner within a building, he could scan the bar code of one or more HVAC's types from a document or electronic list maintained by the facility, which, then the RMU would configure to determine a route of travel within the building to visit one or more locations as input. Or, the HVAC employee could chose the "category" of "HVAC" from the resident index on the RMU, which would then produce a method of travel, to be displayed in a 'en-route' fashion, to the employee to travel to all such HVAC units. Likewise, another type of technician, such as a plumber could input or scan in one or more specific plumbing chases and the RMU would develop path segments to sequence a single route or a circuit to be traveled to visit all desired locations. Also, a person needing to 're-certify' or 're-inspect' equipment, such as medical equipment could use the same method of the RMU to identify a circuit and route for travel to all such items as chosen from the category list.

In an alternative embodiment, a category of persons, places or things can be selected by the HRV user and the RMU would provide path segments towards travel to each item. Thus, the functioning of the RMU would permit selection by category of type of equipment or person, or place to visit and evaluate these items against the requested travel within an assumed or programmed in time or other categorical factor, such as unavailability of travel due to remodeling and/or construction.

In an alternate embodiment, a person, such as a maintenance technician could query the RMU via voice actuated command, saying, for instance, "electrical closets, south annex" whereupon the RMU would compute the necessary path segments to accomplish travel circuits and/or routes to all electrical closets in that annex of the facility. In this fashion also, the RMU's output can be optimized by time, importance, and/or according to maintenance schedule (or other category) to be followed visually and/or audibly to the destination on the RMU. Instead of voice, the RMU could be queried by any other means of selection of category according to the teachings of the present invention.

Figure 5:
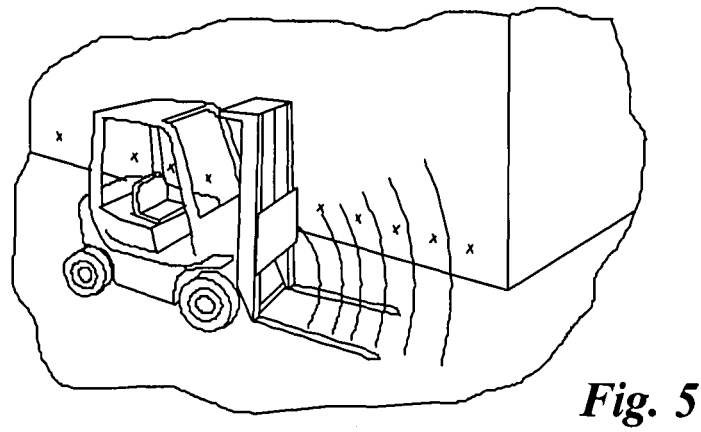
FIG. 5 is a perspective view illustrating the use of the real time travel director on a vehicle, such as a fork lift, the data received by the director and the source tags in the environment.

When activated, the FDLS RMU, whether hand-held or mounted on a vehicle like a forklift, (shown below) continually polls ID tags to determine current relative position of the HRV user and all other input, via the readable ID tags, both in its virtual data base and as affixed and/or existing in a building. (See, FIG. 5). During this process, the RMU inputs this information into the virtual system which then updates the travel of the HRV User along one or more of the defined path segments within the confines of the categories and/or priorities assigned by the HRV User or as assumed by the RMU.

The FDLS RMU indicates a HRV User's progress and the success or failure of the HRV User in traveling along the defined path segments and in arriving at the pre-determined destination(s) or circuits. The FDLS RMU logic system is 'en-route' programmable permitting the introduction of alternate or new destinations during any path segment. The FDLS RMU also provides an interactive/directional map and/or guide and querying functions for initial input or for intermediate input along the defined path segments or expressed as initial or sequential alternatives (two or more methods of travel that the HRV User can select from). The FDLS RMU also permits the prioritizing of travel or stops or categories of items to be included in the desired destination(s) along the way. For instance, if a maintenance worker needed the most preferred method of travel to inspect several facility closets, the FDLS System would project the best method of travel to achieve stops at each desired location. Likewise, if a physician needed to makes numerous 'rounds' to see patients in rooms within a facility such as a Hospital, the FDLS System would give one or more preferred paths segments expressed as a complete circuit that would include stops at each desired location. In this fashion the HRV User can either select to return to his point of origination or exit the facility at another point selected after the desired travel. Also, the FDLS can be programmed to provide that same physician with travel for "priority" stops, for instance, a doctor could use the FDLS System to program his desired route within a hospital based on travel to the most critical patients first. Also, a human HRV User like a patient arriving at a hospital facility for numerous tests could use the FDLS System for finding his/her way to various labs at specific times, as the RMU provides sequencing for time values and provides an alarm queue for beginning the next segment within a complete circuit including a 'timing feature' that would arrange travel to meet pre-specified times. In this fashion the patient HRV User would find the FDLS System useful to find their way in a hospital from the entry point to one specific destination or multiple destinations.

Figure 6:
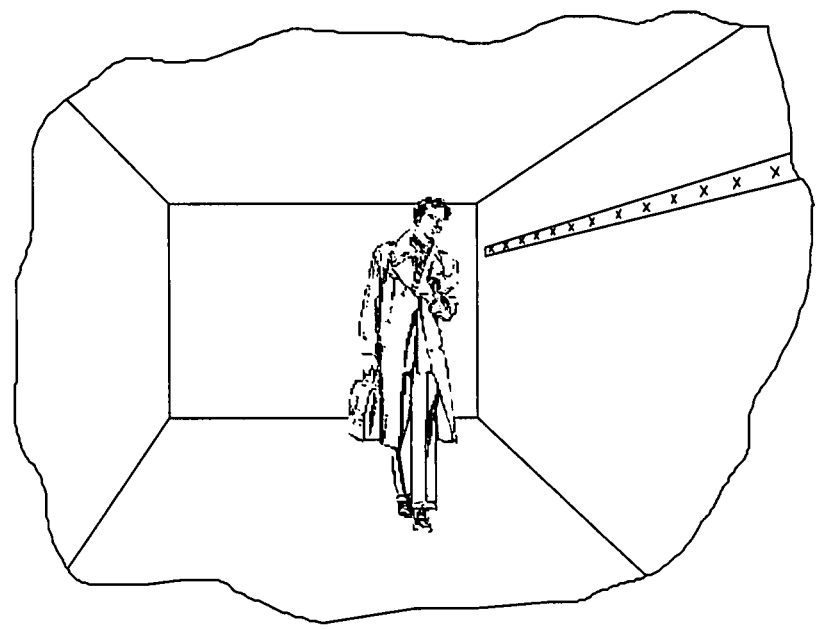
FIG. 6 is a perspective view illustrating the use of the real time travel director by a person in a passageway of the environment.
Figure 7:
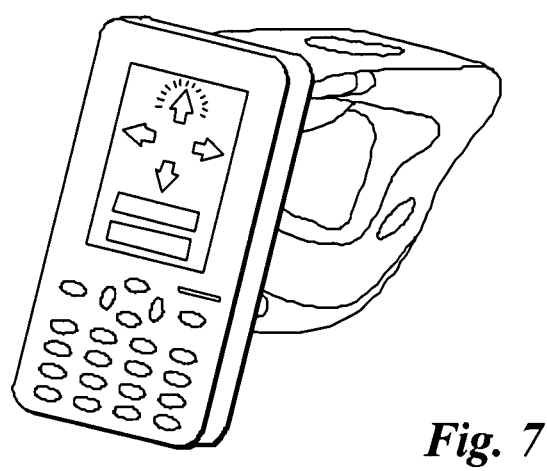
FIG. 7 is a perspective view of the real time travel director illustrating its operation in a multi-level environment.

The mobile FDLS reader/mobile unit ("RMU") once initiated by the HRV user continues to read automatically along the path actually traveled by the HRV user. (See, FIG. 6). I can contain patient coding information to 'ping' a receptor database when the desired destination is reached. Also, the FDLS RMU provides the HRV user with a one or both of visual and/or audio display providing cues as to direction of movement required to achieve each path segment along to the desired destination as well as cues as to intermittent progress along the path segment, via a 'progress bar' or other indicator showing the HRV's progress along the indicated paths, as well as an indicator showing degree of advancement towards the predetermined destination(s), and indicators to advise the user such cues as to either turn left, right, go forward, back up, and/or go up or down one or more levels. (See, FIG. 7).

As the HRV user travels with the mobile reader his origination location remains constant or the FDLS RMU can be reinitiated using any current location along the defined path. The FDLS RMU functions may also be integrated into or attached to existing mobile devices such as PDA and/or cell phone technologies. The FDLS RMU can also direct a similar path segments or circuits to provide directions to specific equipment, places and/or people recognized from unique ID tags resident within the logic virtual computer system.

Likewise, with the FDLS System a robotic could deliver medicines in a hospital based on the FDLS's ability to create from starting and intermittent stop inputs numerous path segments which would be necessary for a complete round; and the FDLS System would provide one or more routes for accomplishing such travel whether for one destination or along a circuit. (See, FIG. 8).

Also, a vehicle, such as a forklift or man-lift could use the FDLS Systems' mobility and destination finding capabilities in order to achieve intermediate stops towards a final destination, or a single destination. Several stops could be programmed into the FDLS System for this purpose, such as several stops to pick up desired inventory before arriving at a loading dock.

The FDLS invention can be programmed in its mobile unit to use currently existing RFID technology, by placing active and/or passive ID tags on a tape strip, doors, walls, ceilings, above ceilings, on or under floors, in or under carpets, within or manufactured as a part of molding or trim or wall coverings by affixing the ID tags by any known method of affixature of a small device to a surface/space. The ID tags once placed and programmed, either internally or as a signal recognized by the virtual logical system contained within the Mobile FDLS device, all relate to one another in the virtual logical computer system program to achieve coordinates from any set of ID tags and/or any other receivable telemetric frequency identified and defined within the physical space in order to decipher one unique position within a building and/or facility and chart and/or project a step by step path segments towards a defined destination within an actual physical building. The Mobile FDLS System uses the input from the ID tags to create real travel through a building/facility avoiding walls and other obstructions and providing travel through hallways, rooms, warehouses, elevators, stairs and other physical attributes of a building/facility that can accommodate HRV traffic.

The FDLS system includes one or more remote mobile units (RMU). (See, examples FIGS. 2 & 7). The RMU operates on a computer platform which is a hardwired and/or mobile/battery operated device capable of programming and/or receiving information such as radio frequency or any other telemetric information. The RMU can use the technology commonly known as mobile RFID transceivers (transmitter/receiver) [often called a "RFID Reader"] as an integral part. The RMU can be a 'dual function' unit that both reads and writes data information from and to ID tags such as passive or active RFID chips or can consist of two separate units, one for programming the ID tags and one for reading and FDLS functioning. (See, FIG. 9). The RMU reader may be as simple as a memory device with a single led light or a complete user friendly GUI interface. The RMU can use simple computing or interface into a grid computing systems that shares idle CPU cycles with other RMU's in the area. Or, the RMU may include and evaluate raster and/or vector information for GUI interface output to a HRV User. The RMU uses the input from the ID tags for completion of the analytical processes as identified above. The RMU reader uses the logical computer interface evaluation operations as identified above to achieve specific results for optimization, prioritization and/or category travel/destinations. The RMU can also operate on the input from a device such as a video camera, audio receiver and/or infra-red receiver which can interpret telemetric signals of original origin or from ID tags. The RMU has certain components including a system for graphical/audio/machine/robotic interface. The RMU has components for evaluating optimization results and output, for evaluating prioritization results and outputs, and for evaluating cateorized information obtained from input from both the defined space environment and HRV User input.

The FDLS system includes ID Tags. ID tags can be a simple as either passive or active RFID tag or tag in combination with other tags or that tag in combination with other telemetric signals, or can be solely based upon original telemetric signals from any emitting/reflecting source readable and/or having a unique signal. (See, FIG. 8). An important new use and invention is the use of an ID tag which can also be a "vector tag" ("VTAG") which is capable of being read by the RMU such that its angle of incidence can be derived relative to the RMU. (See, FIGS. 10, 11 and 12 for examples). The VTAG consists of one or more ID tags placed by aligning multiple tags in close proximity with each other but with differing antennae orientation. (See, FIGS. 9, 10,11). Also, the VTAG can also be deployed to be used in combination with one or more ID tags that have shielding devices over their antenna permitting reception from one orientation, but prohibiting reception/reading from another orientation. One skilled in the art will recognize that this unique application for the VTAG's is pictured in another use by the louvers used on a stop light, which permit viewing from one orientation, but shield viewing from other orientations. (See, FIG. 13). In this fashion the FDLS logical computing system can use reads from the VTAG's to identify orientation and direction of travel as well as the progress/origination/destination of travel of a HRV User to provide its data output.

The FDLS system includes computer interfaces. One or more computer interfaces with middle ware and/or endware which interact with the RMU and/or the main database either along the way or at the beginning point and destination point(s) and any interim point. The FDLS 'reader' is loaded with an intelligent computer logic including user specific information that can 'ping' a receptor program upon arrival at any given point, either to announce arrival or provide other user information electronically, thus, avoiding the need for the user to carry hard copy papers from one location to another (or carry medical records). The FDLS 'reader' program also can operate, in one method, by means of a given protocol that first identifies a starting location and a desired destination from its virtual data base of ID tags and/or other telemetric tags and computes one or more physical path segments for a HRV user to travel along in a defined facility to achieve a real physical travel guide from the origination location to the destination or any number of intermediate positions in-between. The mobile FDLS can also be programmed to provide the most efficient path to one or more predetermined locations or the most efficient paths to series of locations. The FDLS System can also organize a series of destinations input according to a user's desired categories and/or prioritization of persons, places and/or things and it will provide optimized path segments to accomplish the travel within the facility according to established hierarchy protocol. This provides the ability to either design travel within a building and/or facility according to critical step-saving path segments, or according to places that have the most critical need for a visit by the HRV user.

The logic protocol can either use the correlations from actual physical locations in a facility compared with ID locations in the virtual database or the data for identifying the path segments can be derived as relative positions of ID's one from another. Each ID tag will contain information about the type of object it is attached to or represents, and other important categorical information and/or signals that are emitted from the ID tags. This information can be combined and used by the FDLS System to create optimized circuits for building maintenance or other destination objectives. While this invention is focused on a method for a user to find a path to a preset destination or destinations within a building, and will greatly assist the process of return on investment for timely maintenance of building components, many variations and modifications may be made to the described embodiment(s) of the invention without departing substantially from the spirit and principles of the invention. For example, an FDLS RMU could assist a shopper in finding the best method of travel through a large shopping center or store to achieve pre-set shopping goals.

Thus, it is apparent that there has been provided, in accordance with the invention, a real time travel director that fully satisfies the objects, aims and advantages set forth above. While the invention has been described in conjunction with several embodiments thereof, it is evident that many alternatives, modifications and variations will be apparent to those skilled in the art and in light of the foregoing description. Accordingly, it is intended to embrace all such alternatives modifications and variations as fall within the scope of the appended claims.

What is claimed is:

1. For use in navigating, a travel director comprising:
    means for providing a signature signal, the means for providing a signature signal including a plurality of signature signal sources located in respective predetermined positions relative to the predetermined environment;
    means for storing data indicative of the position of the plurality of the signature signal sources and the positions of a plurality of destination locations in relation to the environment, the stored data including a plurality of destination categories, each destination category of the plurality of destination categories including at least one destination location;
    means for selecting at least one destination category;
    means for creating a route from a real time position of the travel director to a final destination, the final destination being one of the plurality of destination locations, the route including each destination location included in the selected destination category, the route being created to optimize the route as a function of predetermined categorical attributes associated with the selected destination category;
    means for receiving a signature signal from at least one of the signature signal sources; and
    means responsive to receipt of the signature signal by said receiving means for comparing said source position and destination position data to determine the position of said director relative to said destination.

2. A director according to claim 1, said storing mean further for storing data indicative of a plurality of discrete travel paths in the predetermined environment.

3. A director according to claim 2, said comparing means further for comparing said source position data, said destination position data and said travel path data to create a virtual route linking said director to the destination.

4. A director according to claim 3 further comprising means for indicating deviation of said director from said virtual route.

5. For use in navigating in a predetermined environment, a travel director comprising:
    means for providing a signature signal, the means for providing a signature signal including a plurality of signature signal sources located in respective predetermined positions relative to the predetermined environment;
    means for storing data indicative of the positions of the plurality of signature signal sources and the positions of the predetermined destinations in relation to the environment, the stored data including a plurality of destination categories, each destination category of the plurality of destination categories including at least one destination location;
    means for selecting one of the predetermined destinations as a final destination;
    means for selecting at least one destination category;
    means for creating a route from a real time position of the travel director to the final destination, the route including each destination location included in the selected destination category, the route being created to optimize the route as a function of predetermined categorical attributes associated with the selected destination category;
    means for receiving unique signature signals from the sources;
    means responsive to receipt of at least one of said signature signals by said receiving means for comparing corresponding said source positions and said selected destination position data to determine the position of said director relative to said selected destination.

6. A director according to claim 5, said storing means further for storing data indicative of a plurality of discrete travel paths in the predetermined environment.

7. A director according to claim 6, said comparing means further for comparing said source position data, said selected destination position data and said travel path data to create a virtual route linking said director to the selected destination.

8. A director according to claim 7 further comprising means for indicating deviation of said director from said virtual route.

9. A travel director according to claim 1, the signature signal sources including passive RFID tags.

10. A travel director according to claim 1, each signature signal source being associated with a category of predefined items.

11. A travel director according to claim 10, the route being optimized by the category associated with the final destination and the selected destination category.

12. A travel director according to claim 1, the route being optimized as a function of a predefined priority between the destination locations.

13. A travel director according to claim 5, the signature signal sources including passive RFID tags.

14. A travel director according to claim 5, each signature signal source being associated with a category of predefined items.

15. A travel director according to claim 14, the route being optimized by the category associated with the final destination and the selected destination category.

16. A travel director according to claim 5, the route being optimized as a function of a predefined priority between the destination locations.

17. An apparatus, comprising:
    a plurality of signature signal sources located in respective predetermined positions relative to a predetermined environment, each signature signal source having a unique identifier;
    a database for storing map data associated with the predetermined environment, the map data including the position of each of the signature signal sources, for storing a plurality of destination locations, each destination location being associated with at least one signature signal source, and for storing a plurality of destination categories, each destination category of the plurality of destination categories including at least one destination location;

a remote unit capable of receiving signals from the signature signal sources, the signals including the unique identifier of the respective signature signal source; and, control logic coupled to the database and the remote unit for receiving a user selection indicative of at least one destination category, for determining each destination location included in the selected destination category, and for establishing a real time position of the remote unit and the positions of the selected destination locations, the control logic being adapted to create a route from an origination location including a real time position of the remote unit to a final destination, the final destination being one of the selected destination locations, the route including each selected destination location, the route being created to optimize the route as a function of predetermined categorical attributes associated with the selected destination category.

18. An apparatus according to claim 17, the signature signal sources including passive RFID tags.

19. An apparatus according to claim 17, each signature signal source being associated with a category of predefined items.

20. An apparatus according to claim 19, the route being optimized by the category associated with the final destination and each destination location.

21. An apparatus according to claim 17, the route being optimized as a function of a predefined priority between the destination locations.

22. An apparatus, as set forth in claim 17, wherein at least one of the signature signal sources includes a vector signal source, the vector signal source being capable of each read by the remote unit such that an angle of incidence relative to the remote unit is derived.

23. An apparatus, as set forth in claim 22, wherein the vector signal source includes at least two tags aligned in close proximity.

24. An apparatus, as set forth in claim 23, wherein each of the tags includes an antenna, the antennas of the tags having differing orientation.

25. An apparatus, as set forth in claim 23, wherein at least one of the at least two tags includes an antenna and a shielding device which allows reception/reading from one orientation and prohibits reception/reading from another orientation.

26. An apparatus, as set forth in claim 17, the control logic for determining a planned period of time to travel the calculated route, for determining a current location of the remote unit along the route, for determining an elapsed period of time from the origination location to the current location, and for responsively displaying a notification if the elapsed time is different than the planned period of time.

27. An apparatus, as set forth in claim 17, the control logic for generating a prioritized destinations list including an order of destination locations based on a user selection and for determining the route based on the prioritized destinations list.

28. An apparatus, as set forth in claim 17, wherein the predefined environment is one of a hospital, a store, and a warehouse.

29. An apparatus, as set forth in claim 17, wherein the predefined environment is a hospital, at least one destination category of the plurality of destination categories includes hospital patients associated with a doctor.

30. An apparatus, as set forth in claim 17, wherein the plurality of destination categories includes at least one of persons, places, and equipment located within the predetermined environment.

31. An apparatus, as set forth in claim 17, wherein the plurality of destination categories includes at least one of HVAC units, electrical boxes, and plumbing located within the predetermined environment.

32. An apparatus, as set forth in claim 17, wherein the remote unit is adapted to be coupled to a vehicle to facilitate navigating the vehicle through the predetermined environment.

33. An apparatus, as set forth in claim 17, wherein the remote unit is adapted to be coupled to a robotic to facilitate navigating the robotic through the predetermined environment.

34. An apparatus, as set forth in claim 17, wherein the remote unit includes at least one of a PDA and a cell phone.

35. An apparatus, as set forth in claim 17, wherein the predefined environment includes is one of a shopping center and a grocery store, at least one destination category of the plurality of destination categories includes a prioritized list of shopping items associated with a shopper, the route being created to optimize the route as a function of the prioritized list of shopping items to assist the shopper in traveling through the predefined environment.

\* \* \* \* \*